(12) United States Patent
Ichikawa

(10) Patent No.: US 7,208,214 B2
(45) Date of Patent: Apr. 24, 2007

(54) HONEYCOMB STRUCTURAL BODY AND DIE FOR FORMING HONEYCOMB STRUCTURAL BODY BY EXTRUSION

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 51 days.

(21) Appl. No.: 10/784,767

(22) Filed: Feb. 24, 2004

(65) Prior Publication Data

US 2004/0170803 A1   Sep. 2, 2004

(30) Foreign Application Priority Data

Feb. 28, 2003  (JP)  ............... 2003-052581

(51) Int. Cl.
  *B32B 3/12*  (2006.01)
(52) U.S. Cl. ............... 428/116; 117/428; 117/188; 422/177; 422/180
(58) Field of Classification Search ........ 428/116–117, 428/34.4, 188, 212, 213, 220; 422/180, 177, 422/222
See application file for complete search history.

(56) References Cited

U.S. PATENT DOCUMENTS 4,519,820 A * 5/1985 Oyobe et al. ............... 55/284
4,759,892 A * 7/1988 Bonzo ........................ 264/251
2002/0175451 A1* 11/2002 Vance et al. ............... 264/631
2004/0123573 A1* 7/2004 Ichikawa et al. ............. 55/523
2004/0131512 A1* 7/2004 Abe et al. ................... 422/180
2004/0161373 A1* 8/2004 Ichikawa et al. ........... 422/180

FOREIGN PATENT DOCUMENTS

JP          A 4-301114      10/1992

OTHER PUBLICATIONS

JP-2002-326035 translation included.*

* cited by examiner

*Primary Examiner*—Jennifer McNeil
*Assistant Examiner*—Timothy M. Speer
(74) *Attorney, Agent, or Firm*—Oliff & Berridge, PLC

(57) ABSTRACT

A honeycomb structural body having a plurality of cells and partition walls defining the cells, wherein a cross-section of each partition wall perpendicular to the flow direction of a fluid to be permeated has a grille shape of which gratings cross in x axis and Y axis directions, and there are at least two kinds of cells different in their cross-sectional areas perpendicular to the flow direction of a fluid to be filtered by virtue of changing intervals of the partition walls in the x axis direction and/or intervals of the partition walls in the y axis direction, as predetermined. Each cell is defined by two parallel partition walls having the same length and another two parallel partition walls having the same length crossing each other and being formed at the predetermined intervals. A die usable for forming such a honeycomb structure is also disclosed.

18 Claims, 14 Drawing Sheets

Prior Art

PRIOR ART

HONEYCOMB STRUCTURAL BODY AND DIE FOR FORMING HONEYCOMB STRUCTURAL BODY BY EXTRUSION

BACKGROUND OF THE INVENTION

1. Field of the Invention

The present invention relates to a honeycomb structural body and a die for forming the honeycomb structural body by extrusion. More particularly, the present invention relates to a honeycomb structural body suitably used as a filter for collecting fine particles in exhaust gas from internal combustion engines, boilers, and the like or as a filter for liquids in water supply system, sewerage system, and the like, while controlling an increase in the pressure loss during use, and to a die capable of easily forming such a honeycomb structural body by extrusion.

2. Description of Background Art

In view of the effects on environment, necessity for removing fine particles and toxic substances from exhaust gas of internal combustion engines, boilers, and the like has been increasing. In particular, regulations on removal of particulates from diesel engines are showing an intensified trend in the U.S., Europe, and Japan. A honeycomb filter utilizing a honeycomb structural body to collect particulates (hereafter called a diesel particulate filter or DPF) is used. The honeycomb filter utilizing a honeycomb structural body is also used for filtering liquids in water supply and sewerage systems (see JP-A-4-301114)

As shown in FIGS. 14(a) and 14(b), the honeycomb filter used for such an objective generally comprises an inlet port end face 42 and an outlet port end face 44 for a fluid, a partition wall 32 extending from the end face 42 to the end face 44, and a number of cells 33a and 33b with a square cross-section divided by the partition wall 32 and penetrating from the inlet port end face 42 through the outlet port end face 44, wherein each of adjacent cells 33a and 33b are plugged at the opposite end face so that the inlet port end face 42 and an outlet port end face 44 have respectively in a checkerwise pattern as a whole. In the honeycomb filter 31 having such a configuration, since a fluid such as a gas and liquid flows into cells 33b opening in the inlet port end face 42, specifically the cells 33b plugged at the outlet port end face 44, penetrates through the porous partition wall 32 into the adjacent cells 33a which are plugged at the inlet port end face 42, specifically the cells 33a opening on the outlet port end face 44, and is discharged from the cells 33a. In this instance, the partition wall 32 serves as a filtration side and the collected matters are deposited on the partition wall 32.

However, when the honeycomb filter 31 using such a honeycomb structural body is used as a DPF and the like, if a large amount of deposits such as soot accumulate in the opening of the cells 33b on the inlet port end face 42, the open area on the inlet port end face 42 decreases or the opening is blocked resulting in an increase in the pressure loss of the honeycomb filter 31. The output of the diesel engine is lowered and the fuel consumption decreases.

The present invention has been completed in view of such a situation and has an object of providing a honeycomb structural body suitably used as a filter for collecting fine particles in exhaust gas from internal combustion engines, boilers, and the like or as a filter for liquids in water supply and sewerage systems while controlling an increase in the pressure loss during use, a filter structure utilizing such a honeycomb structural body, and a die capable of easily forming such a honeycomb structural body by extrusion.

SUMMARY OF THE INVENTION

In order to achieve the above object, the present invention provides the following honeycomb structural bodies.

[1] A honeycomb structural body having a plurality of cells to function as a passage for a fluid divided by porous partition walls, specified cells being plugged at one of open end faces and the remaining cells being plugged at other end face alternately, a fluid flowing into the open end face side of one set of cells being caused to pass through the cells and permeate through the partition walls, thus permeated fluid being discharged from the open end face side of the other cells, wherein a cross-section pattern of the partition walls perpendicular to flow direction of the fluid has a grille shape of which gratings cross in x axis and y axis directions, and there are at least two kinds of cells different each other in their cross-sectional areas perpendicular to the flow direction of a fluid to be filtered by virtue of changing intervals of the partition walls in the x axis direction and/or intervals of the partition walls in the y axis direction (hereinafter referred to from time to time as "the first invention").

[2] The honeycomb structural body described [1] above, wherein the intervals of the partition walls in the x axis direction and/or the intervals of the partition walls in the y axis direction are determined by a repetition of which the unit is a prescribed pattern, whereby the intervals of the partition walls are changed, as predetermined.

[3] The honeycomb structural body described in [1] or [2] above, wherein one of the open end faces of the specified cells and the other open end face of the remaining cells are alternately plugged to form a checkerwise pattern as a whole.

[4] The honeycomb structural body described in any one of [1]–[3] above, wherein the cell having the largest cross-section among the above-mentioned cells (hereinafter sometimes referred to as the maximum cell) has a shape of a rectangle and the thickness of the partition wall forming the long side of the maximum cell is thicker than the thickness of the partition wall forming the short side of the maximum cell.

[5] The honeycomb structural body described in any one of [1]–[4] above, wherein the partition wall has a porosity of 20% or more.

[6] The honeycomb structural body described in any one of [1]–[5] above, wherein the partition wall is made of a material containing a ceramic and/or a metal as major components.

[7] The honeycomb structural body described in [6] above, wherein the major components forming the partition wall are one or more materials selected from the group consisting of cordierite, mullite, alumina, spinel, silicon carbide, silicon nitride, aluminum nitride, zirconia, lithium aluminum silicate, aluminum titanate, Fe—Cr—Al metals, metal silicon, activated carbon, silica gel, and zeolite.

[8] The honeycomb structural body described in any one of [1]–[7] above, wherein a catalyst is carried on the surface of the partition wall and/or the pore surface inside the partition wall.

[9] A filter structure comprising a honeycomb structural body described in any one of [1]–[8] installed in a fluid passage to collect substances to be removed from the fluid (hereinafter sometimes referred to as "the second invention").

[10] The filter structure described in [9] above, wherein the cells having the largest cross-sectional area (hereinafter sometimes referred to as the largest cells) among the cells forming the honeycomb structural body are open without being plugged at the open end face on the inlet port side of the fluid.

[11] The filter structure described in [9] or [10] above, wherein the honeycomb structural body is installed so that the total sum of the cross-sectional areas perpendicular to the fluid flow direction of the cells that are open on the end face on the inlet port side of the fluid is larger than or equal to the total sum of the cross-sectional areas perpendicular to the fluid flow direction of the cells that are open on the end face on the outlet port side of the fluid.

[12] The filter structure described in any one of [9]–[11] above, wherein the honeycomb structural body is used to collect and remove fine particulates in exhaust gas as a filter.

[13] A die for forming the honeycomb structural body by extrusion comprising a die base having at least two surfaces, which is provided with a raw material introducing part for introducing a raw material from a first opening on one side and an extrusion part communicating with the raw material introducing part to extrude the raw material supplied by the raw material introducing part from a second opening on the other side, thereby forming a honeycomb structural body, wherein the cross-section of the extrusion part composed of the second opening on the plane perpendicular to the direction in which the raw material is extruded has a pattern of a grille as a whole, with crossing slits opening both in the x axis direction and in the y axis direction, wherein either the intervals between the two adjacent slits opening in the x axis direction or the intervals between the two adjacent slits opening in the y axis direction are not equal, with the slits being arranged at unequal intervals either in the x axis direction or the y axis direction (hereinafter referred to from time to time as "the third invention").

[14] The die for forming the honeycomb structural body by extrusion described in [13] above, wherein either the intervals between the two adjacent slits opening in the x axis direction or the intervals between the two adjacent slits opening in the y axis direction are not equal, with the other intervals being equal.

[15] The a die for forming the honeycomb structural body by extrusion described in [13] above, wherein both the intervals between the two adjacent slits opening in the x axis direction and the intervals between the two adjacent slits opening in the y axis direction are not equal and the pattern of unequal intervals is the same in both x and y axis directions.

[16] The a die for forming the honeycomb structural body by extrusion described in [13] above, wherein both the intervals between the two adjacent slits opening in the x axis direction and the intervals between the two adjacent slits opening in the y axis direction are not equal and the pattern of unequal intervals in the x axis direction differs from the pattern of unequal intervals in the y axis direction.

DETAILED DESCRIPTION OF THE EMBODIMENT

Embodiments of the honeycomb structure, the filter structural body, and the die for extrusion molding of the honeycomb structural body of the present invention are described below in detail with reference to the drawings. However, the present invention is not limited to these embodiments.

Figure 1A:
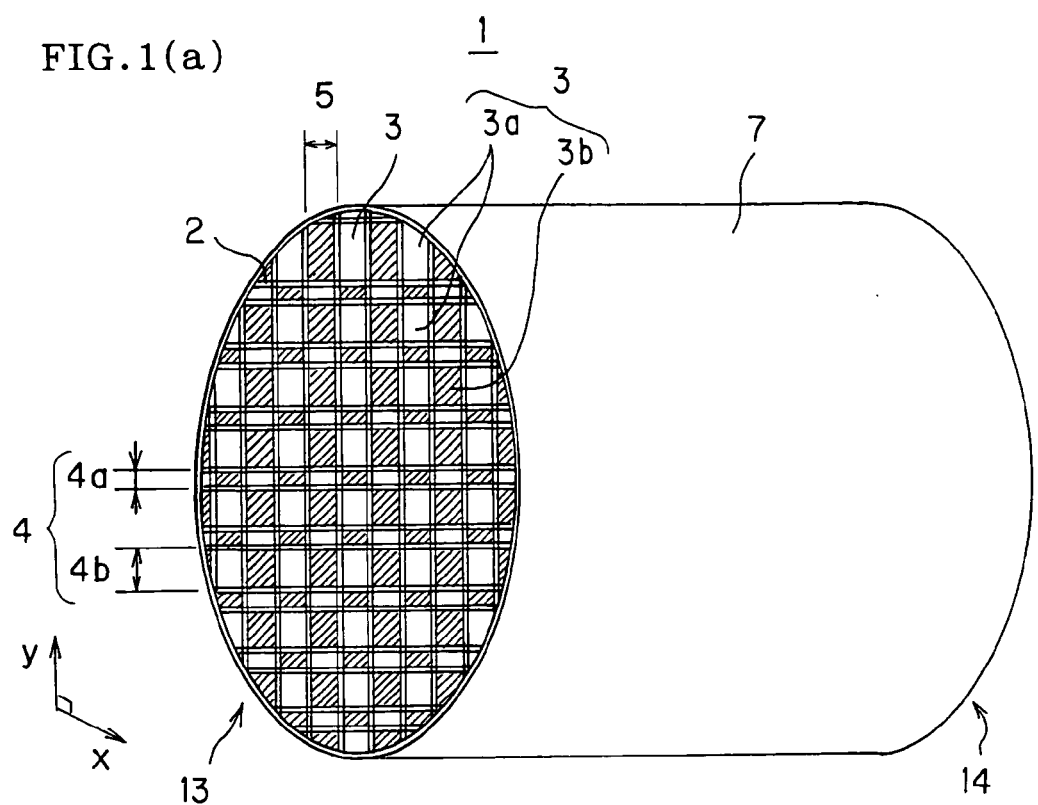
FIG. 1(a) is a perspective view showing one embodiment of the honeycomb structural body and FIG. 1(b) is a plan view showing the end face on the side from which a fluid is introduced in the honeycomb structural body the present invention (first invention).
Figure 1B:
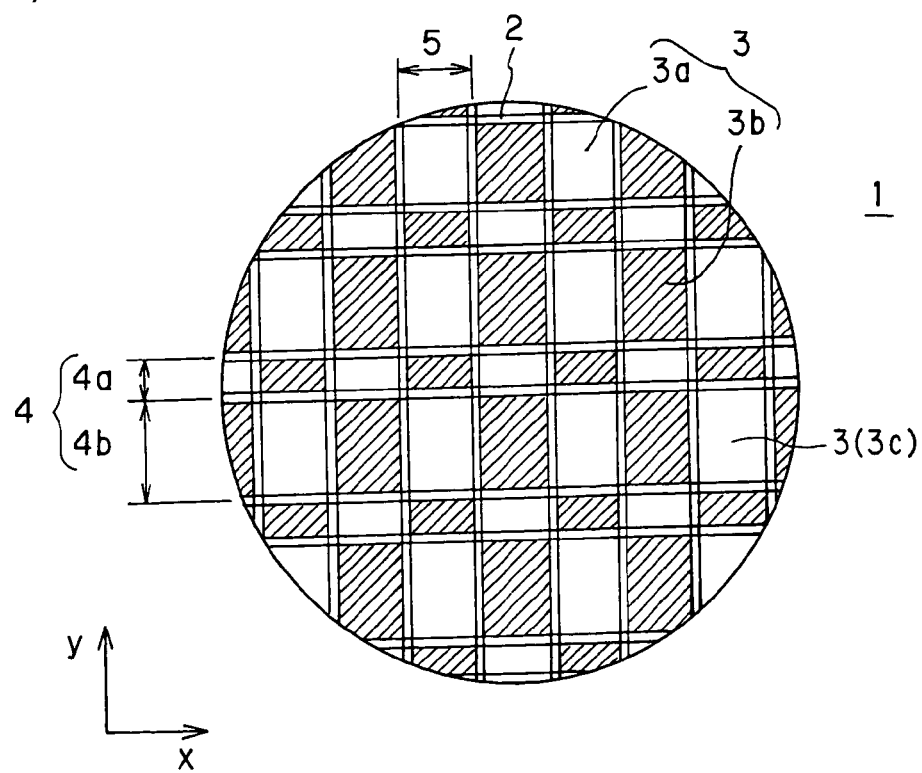

First, an embodiment of the honeycomb structural body of the first invention will be described in detail. As shown in FIG. 1(a) and FIG. 1(b), the honeycomb structural body 1 of this embodiment has a plurality of cells 3 used as passages for a fluid. The cells are formed being defined by porous partition walls 2. Of the two open end faces 13 and 14 for the cells 3, the open end face 13 of specific cells 3a is plugged and the open end face 14 of the cells 3b other than the cells 3a is plugged. The fluid flowing into the open end face 13 side for the cells 3a is caused to pass through the cells 3 and permeate through the partition walls 2. The permeated fluid is discharged from the open end face 14 side for the cells 3b. The cross-section of the partition wall 2 perpendicular to the flow direction of the fluid has a grille-like shape of which gratings cross in the x axis and Y-axis directions, respectively. The distance 4 between the partition walls 2 in the x-axis direction and/or the distance 5 between the partition walls 2 in the y axis direction are varied (wide or narrow). For example, in FIG. 1(a) and FIG. 1(b), the distance 4a between the partition walls 2 in the x-axis direction of some cells differs from the distance 4b between the partition walls 2 in the x axis direction of the other cells. Thus, the cross-sectional area vertical to the flow direction of the fluid of some cells 3 differs from that of the other cells 3. In FIG. 1(a), FIG. 1(b), and the following drawings, shadow cells 3b indicate the cells plugged at that end face.

In this embodiment, there are two kinds of cells 3 different in cross-sectional areas perpendicular to the flow of the fluid by virtue of changing the distance 4 between the partition walls 2 in the x axis direction and/or the distance 5 between the partition walls 2 in the y axis direction. The cells 3 having a large cross-sectional area hardly clog up with deposited materials and the like. When compared with a conventional honeycomb structural body of the same size, of which the cross-section perpendicular to the flow direction of the fluid consists of a number of squares with the same shape and the same dimensions, the honeycomb structural body 1 of this embodiment may contain cells 3c with a large cross-sectional area without changing the filtration area or the surface area of the partition walls 2. The honeycomb structural body configured in this manner can be suitably used as a filter for collecting fine particles in exhaust gas from internal combustion engines, boilers, and the like or a filter for liquids in water supply systems, sewerage systems, and the like while controlling an increase in the pressure loss during use.

Figure 2A:
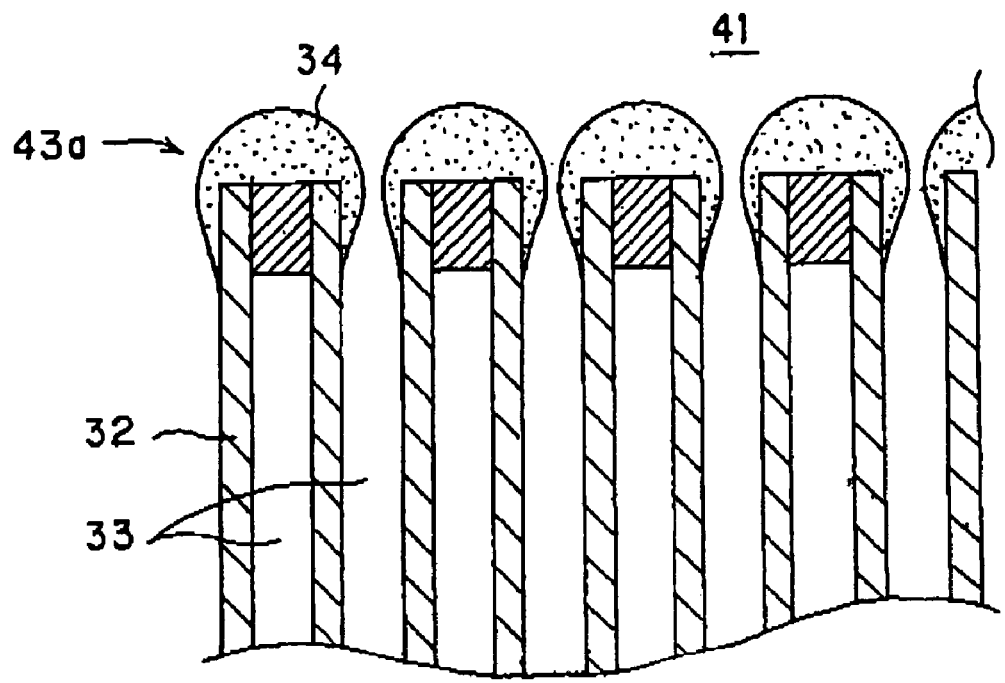
FIG. 2(a) and FIG. 2(b) are cross-sectional views schematically showing the process of blockage of the opened end of cells forming a conventional honeycomb structural body with fine particles and the like when the conventional honeycomb structural body is used as a filter.
Figure 2B:
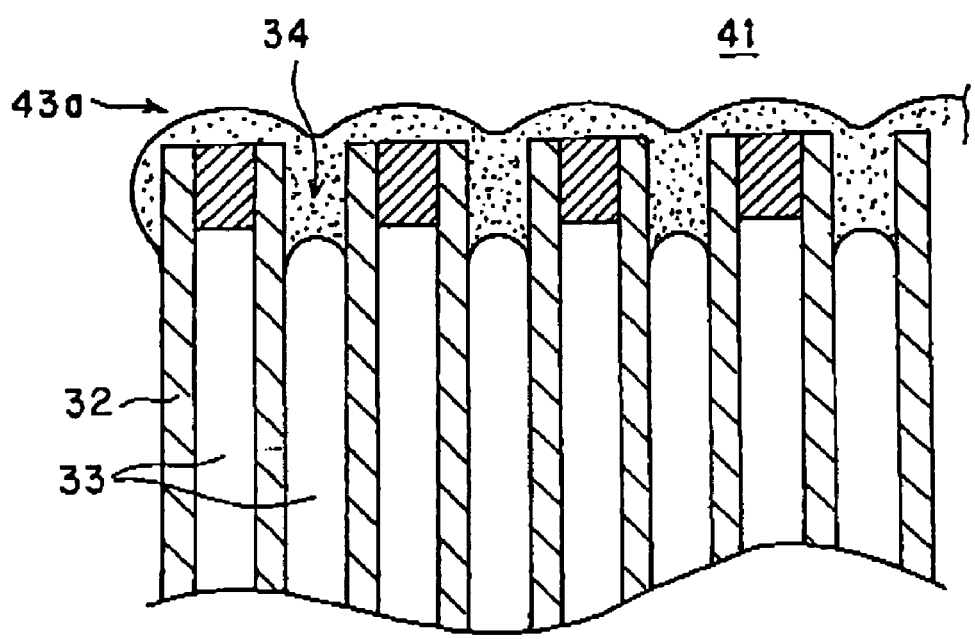

In a conventional honeycomb structural body 41 shown in FIG. 2(a) used for DPF and the like, particulates 34 contained in exhaust gas discharged from diesel engines gradually accumulate from the periphery of the end face 43a of cells 33 on the inlet port side, thereby decreasing the open area. A deposit of particulates 34 bridges with an adjacent deposit, finally clogging the open end face 43a of the cells 33 as shown in FIG. 2(b). If the open end faces 43a of all cells 33 forming the honeycomb structural body 41 are clogged up, exhaust gas cannot be discharged to the outside. Problems such as breakdown of diesel engines may occur. For this reason, the honeycomb structural body must be frequently regenerated by oxidizing the deposit such as soot by heating the DPF and the like before the opening end face 43a is clogged. Since the honeycomb structural body 1 of this embodiment has cells 3c with a relatively large cross-sectional area as shown in FIG. 1(b), the period of time until the open end of the cells 3c on the inlet port side is clogged can be extended, whereby frequency of the regeneration operation mentioned above can be reduced. In addition, since DPF and the like are not subjected to unnecessary temperature stress if the frequency of the regenerating operation is decreased, degradation of the partition walls 2 forming the honeycomb structural body 1 can be suppressed.

Figure 3:
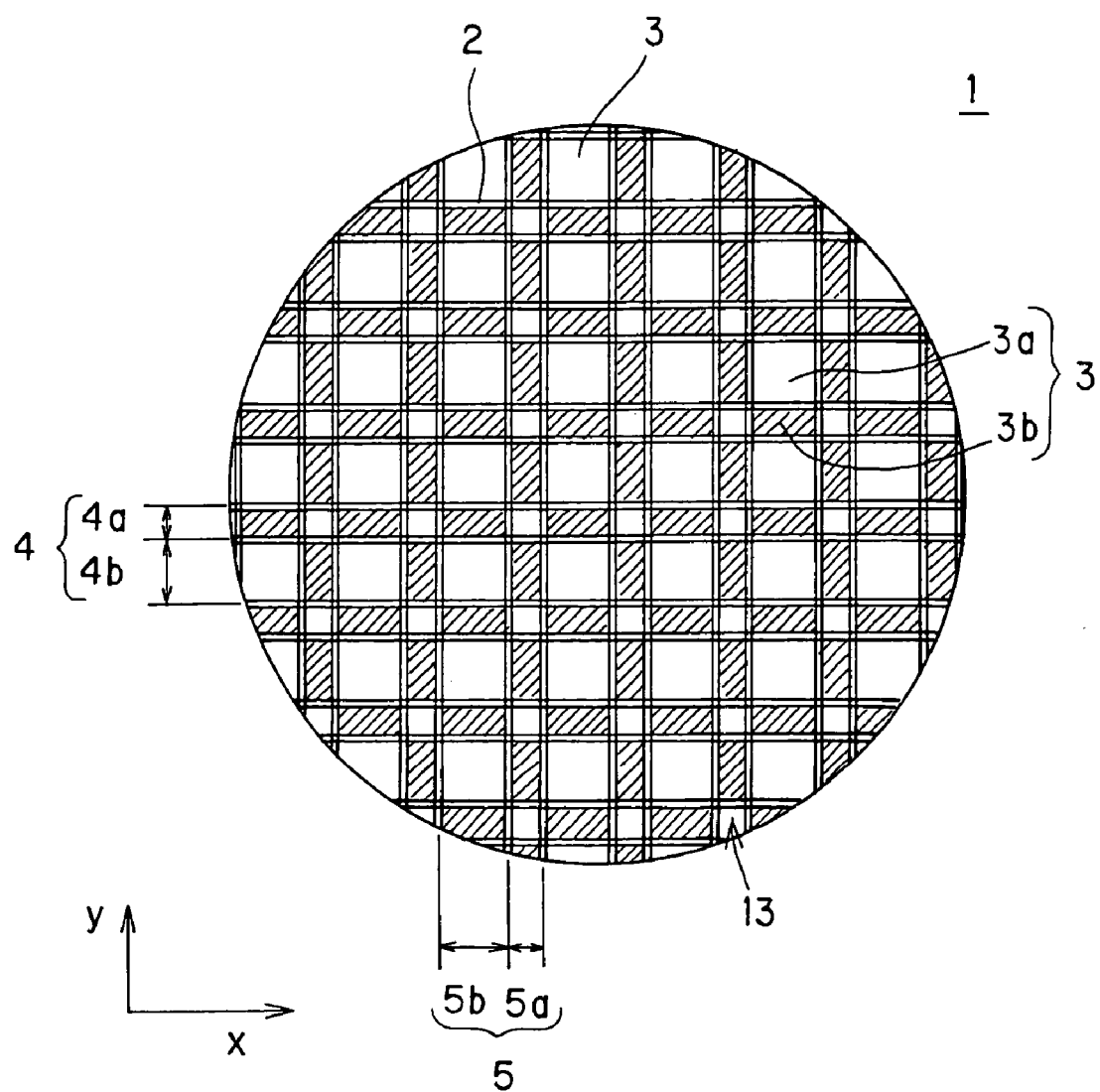
FIG. 3 is a plan view showing the end face on the side from which a fluid is introduced in another embodiment of the honeycomb structural body of the present invention (the first invention).

In this embodiment, the distance 4 between the partition walls 2 in the x axis direction and/or the distance 5 between the partition walls 2 in the y axis direction are preferably determined by a repetition of which the unit is a prescribed pattern, whereby the distances (intervals) between the partition walls 2 are changed as shown in FIG. 1(a) and FIG. 1(b). In the honeycomb structural body 1 shown in FIG. 1(a) and FIG. 1(b), the distance 5 between the partition walls 2 in the x axis direction is fixed and the distance between the partition walls 2 in the y axis direction varies for every other grating as shown by 4a and 4b in FIG. 1(a) and FIG. 1(b). This need not be necessarily always applied. For instance, the distances 4a and 4b between the partition walls 2 in the x axis direction and the distances 5a and 5b in the y axis direction may be repeated in the same pitch for every other grading as shown in FIG. 3, or the distance between the partition walls 2 in the x axis direction and the distance between the partition walls 2 in the y axis direction may be repeated for every other grading in different pitches (not shown in the Figures). FIG. 3 is a plan view schematically showing the end face 13 on the side from which a fluid is introduced in another embodiment of the honeycomb structural body of the present invention.

It is preferable in this embodiment that one of the end faces 13 of specified cells 3a and the other end face 14 of cells 3b other than the cells 3a are alternately plugged so that the gratings form a checkerwise pattern as a whole as shown in FIG. 1(a) and FIG. 1(b). This configuration ensures effective utilization of the partition walls 2 as a filter membrane.

In the honeycomb structural body 1 shown in FIG. 1(a) and FIG. 1(b), the total cross-sectional areas of openings of the cells 3 that open on one of the end faces 13 is the same as the total cross-sectional areas of openings of the cells 3 that open on the other end face 14. In the honeycomb structural body 1 shown in FIG. 3, the total cross-sectional areas of openings of the cells 3 that open on one of the end faces 13 is larger than the total cross-sectional areas of openings of the cells 3 that open on the other end face. The honeycomb structural body 1 shown in FIG. 3 can reduce the pressure loss at an initial stage without changing the filtration area as compared with a conventional honeycomb structural body. In this embodiment, there are three types of cells each of which has a different cross-sectional area perpendicular to the fluid flow direction.

Figure 4:
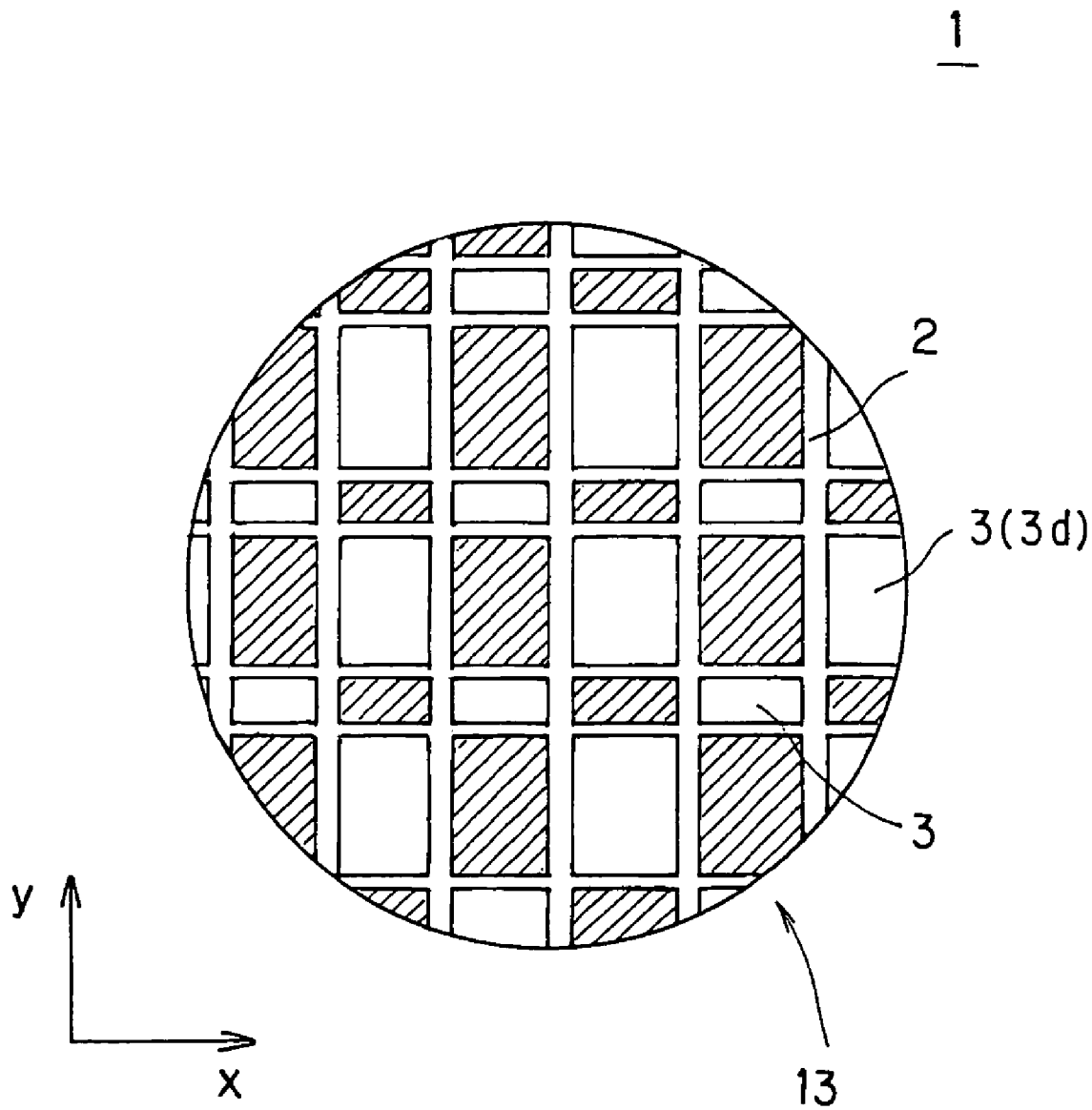
FIG. 4 is a plan view showing the end face on the side from which a fluid is introduced in another embodiment of the honeycomb structural body the present invention (the first invention).

In the honeycomb structural body 1 of this embodiment, when the cells 3 that open on one of the end faces 13 are rectangular as shown in FIG. 4, the thickness of the partition wall 2 forming the long side of the cell 3d having the largest cross-sectional area is preferably thicker than the thickness of the partition wall 2 forming the short side. In FIG. 4, since the cell 3d with a largest cross-sectional area is a rectangle of which the long side is in the y axis direction, the thickness of the partition wall 2 forming the long side (in the y axis direction) should be greater than the thickness of the partition wall 2 forming the short side (in the x axis direction). This configuration can increase the mechanical strength of the honeycomb structural body 1. An increased thickness of the partition wall 2 enlarges the volume of the partition wall 2, which results in an increased pore surface area inside the partition wall 2. When a catalyst is carried on the pore surface, a reaction with particulates will be promoted, giving rise to an increase in the regeneration capacity of particulates. In addition, since the amount of particulates stored inside the partition walls 2 can decrease, the amount of the particulates deposited on the surface of partition walls 2 can decrease, whereby it is possible to delay narrowing of the cell 3 passages due to deposition of particulates. Furthermore, since the heat capacity increases due to the increased thickness of the partition walls 2, it is possible to control the effect of heat generated when particulates are burnt for regeneration. Instead of increasing the thickness of the partition walls 2 to control the effect of heat during burning of particulates, a means to cover the surface of the partition walls 2 and the pore surface with a heat resistant material with a high heat capacity such as aluminum titanate, alumina, mullite, silicon carbide, siliconnitride, zirconium, tungsten, ortantalum, eitheralone or in combination with other materials is effective. Incorporating such a heat resistant material in the partition wall material organization is also an effective means. These means may be employed in combination with thickening the partition walls 2. When incorporating the heat resistant material in the partition wall material organization, the material may be either in the shape of particles or fiber. In the case of the fiber, a short fiber may be dispersed inside the organization or a long fiber may be arranged along the cell passage. There are no specific limitations to the shape of particles or the cross-sectional shape of the fibers.

Although there are no specific limitations to the average cell density of the honeycomb structural body 1 of the embodiment shown in FIG. 1(a), if the average cell density is too small, the strength and effective GSA (geometric surface area) may be insufficient when the honeycomb structural body 1 is used as a filter, whereas if the average cell density is too large, the pressure loss at the initial stage increases. The cell density is preferably 6–2,000 cells/in$^2$ (0.9–311 cells/cm$^2$), more preferably 50–1,000 cells/in$^2$ (7.8–155 cells/cm$^2$), and most preferably 100–400 cells/in$^2$ (15.5–62.0 cells/cm$^2$).

Although there are no specific limitations to the thickness of the partition wall 2 in the honeycomb structural body 1 of this embodiment, if the partition wall 2 is too thick, the initial pressure loss when a fluid penetrates through the porous partition wall 2 will be too large; whereas if too thin, the strength of the partition wall 2 is insufficient. The thickness of the partition wall is preferably 30–2,000 μm, more preferably 40–1,000 μm, and most preferably 50–750 μm. The partition wall 2 is preferably provided with a peripheral wall 7 covering the periphery. The thickness of the peripheral wall 7, which is preferably larger than the thickness of the partition wall 2 to increase the strength of the honeycomb structural body 1, is in the range of preferably 45–6,000 μm, more preferably 60–4,000 μm, and most preferably 75–2,000 μm. In addition to an integral wall formed integrally with the partition wall 2 at the time of fabrication, a peripheral wall 7 coated with a cement, which is formed by cutting the periphery after fabrication to form a prescribed shape and forming the peripheral wall 7 using cement or the like, can be used.

The partition wall 2 of the honeycomb structural body 1 of this embodiment is a porous material. There are no specific limitations to the pore size. A person skilled in the art may appropriately determine the pore size according to the application. In general, the pore size can be determined according to the viscosity of a fluid and the object to be separated in the fluid. In the case of using the honeycomb structural body 1 as a DPF, for example, a preferable average pore size is about 1–100 μm. The pore size is preferably 0.01–10 μm when the honeycomb structural body 1 is used for purifying water.

In the honeycomb structural body 1 of this embodiment, the porosity of the partition wall 2 is important and has a significant effect on the initial pressure loss. Too small a porosity of the partition wall 2 is undesirable because the initial pressure loss is too large. When the honeycomb structural body 1 is used for a DPF, for example, the porosity is preferably 20% or more, more preferably 30% or more, and particularly preferably 40% or more. Increasing the porosity by decreasing the thickness of the partition wall 2 is a preferable embodiment in the present invention from a viewpoint of reducing the initial pressure loss. The honeycomb structural body with a thickness of the partition wall of 0.5 mm or less, preferably 0.45 mm or less, and more preferably 0.4 mm or less, and a porosity of 30% or more, and more preferably 40% or more, for example, is preferable. Since too large a porosity decreases the strength, the porosity is preferably 90% or less. When the honeycomb structural body 1 is used as a filter required to be low in pressure loss such as a filter which carries a catalyst thereon to continuously incinerate particulates, the porosity is preferably 30–90%, more preferably 50–80%, and particularly preferably 50–75%. When the honeycomb structural body 1 of this embodiment is used as a filter of the type in which the catalyst to promote burning of particulates in exhaust gas is carried on the partition wall 2, the honeycomb structural body 1 must be formed from a material dense and strong enough to resist a thermal stress produced when particulates are burnt. The porosity of such a material is preferably 20–80%, more preferably 25–70%, and particularly preferably 30–60%. In this embodiment, the porosity is indicated by volume percent.

Although there are no specific limitations to the material for the partition wall 2 in the honeycomb structural body 1 of this embodiment, the major component for the material is preferably various oxide or non-oxide ceramics or metals from the viewpoint of hardness, heat resistance, durability, and the like. As specific examples of the ceramics, cordierite, mullite, alumina, spinel, silicon carbide, silicon nitride, aluminum nitride, zirconia, lithium aluminum silicate, and aluminum titanate can be given. As examples of the metals, Fe—Cr—Al series metals, silicon metal, and the like can be given. A material containing one or more of these major components is preferable. Adsorption materials such as activated carbon, silica gel, and zeolite can also be given as suitable materials for the partition wall 2. From the viewpoint of high strength and high heat resistance, one or more materials selected from the group consisting of alumina, mullite, zirconia, silicon carbide, and silicon nitride are preferable. From the viewpoint of the coefficient of thermal conductivity and heat resistance, silicon carbide or a silicon-silicon carbide composite material is particularly suitable. The main component herein refers to a component making up 50 mass % or more, preferably 70 mass % or more, and more preferably 80 mass % or more of the partition wall 2. A pore forming material may also be added. Any materials that can scatter and be dissipated during a sintering process can be used as the pore forming material. Inorganic substances such as carbonaceous materials, polymer compounds such as plastic materials, or organic substances such as starch may be used either independently or in combination of two or more.

Although there are also no specific limitations to the material for plugging the openings on the end faces 13 and 14, a material containing one or more substances selected from the group consisting of the ceramics, metals, and adsorption materials mentioned above as suitable materials for the partition wall 2 of the honeycomb structural body 1 as major components can be preferably used.

When the honeycomb structural body 1 of this embodiment is used as a filter, it is a preferable to cause a catalyst which can remove deposits on the partition wall 2, for example, a metal possessing catalytic capability, to be carried on the surface of the partition wall 2 and/or the pore surface inside the partition wall 2. Particularly, when the honeycomb structural body 1 is used as a DPF, a catalyst possessing a function of promoting combustion of particulates collected by the partition wall 2 is preferably used. Specific examples of such a catalyst include noble metals such as Pt, Pd, and Rh, and nonmetal perovskite-type catalysts. At least one of these catalysts is preferably carried on the surface of the partition wall 2.

A honeycomb structural body 1 fabricated by integrating two or more segments and a honeycomb structural body 1 having a slit are also preferable in this embodiment. The thermal stress can be dispersed and cracks due to the thermal stress can be prevented by breaking down a honeycomb structural body into two or more segments and integrating them into one piece, or by producing slits in the honeycomb structural body 1. Although there are no limitations to the size and shape of each segment when breaking down a honeycomb structural body into two or more segments and integrating them into one piece, the effect of preventing cracks by segmentation cannot be fully be demonstrated if each segment is too large, whereas too small segments are not preferable due to the requirement of a complicated procedure for production and integration of the small segments. The cross-sectional area of each segment is preferably 900–10,000 $mm^2$, more preferably 900–5,000 $mm^2$, and most preferably 900–3,600 $mm^2$. When the honeycomb structural body 1 is used as a filter, it is desirable that 70% or more of the filter volume be composed of the honeycomb segments of this dimension. A segment having a square cross-section, specifically a quadratic prism segment may be a basic configuration of the segment. A number of such segments are integrated for forming a honeycomb structural body. The shape of segments forming the periphery can be suitably selected according to the shape of the honeycomb structural body. There are no specific limitations to the cross-section shape of the honeycomb structural body 1. The shape is not limited to a circle shown in FIG. 1(*a*), but may be, for example, approximately circular such as an oval, racetrack form, and ellipse, and a polygon such as a quadrangle and hexagon.

Figure 5:
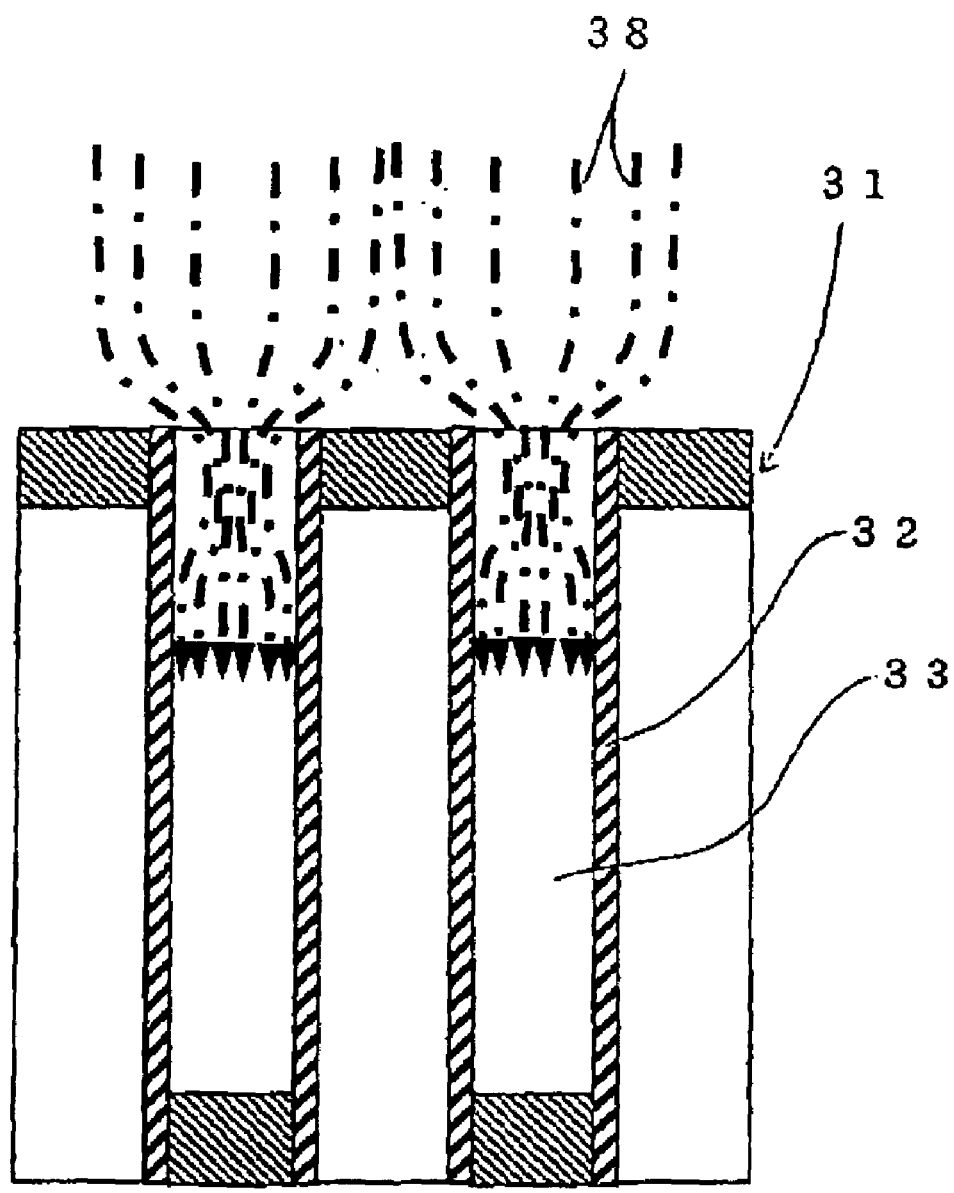
FIG. 5 is a cross-sectional view schematically showing a process of deposition of particulates collected by a common filter in the form of a honeycomb structural body on the partition walls of the honeycomb structural body.

A deposition process of particulates collected by a common filter in the form of a honeycomb structural body on the partition walls will now be illustrated. As shown in FIG. 5, when exhaust gas 38 flows into the honeycomb filter 31, the exhaust gas 38 turns at the inlet port of the cell 33 and flows in the cell 33 in a contracted state. The flow of exhaust gas 38 stagnates near the surface of the partition wall 32 around the inlet port of the cell 33. The flow speed of the exhaust gas 38 is very low in the stagnated area. Since the flow speed of the particulates contained in the exhaust gas 38 is also reduced in the stagnated area, particulates 34 are easily collected by the partition wall 32 and produces many deposits around the inlet port of the cell 33.

Figure 6A:
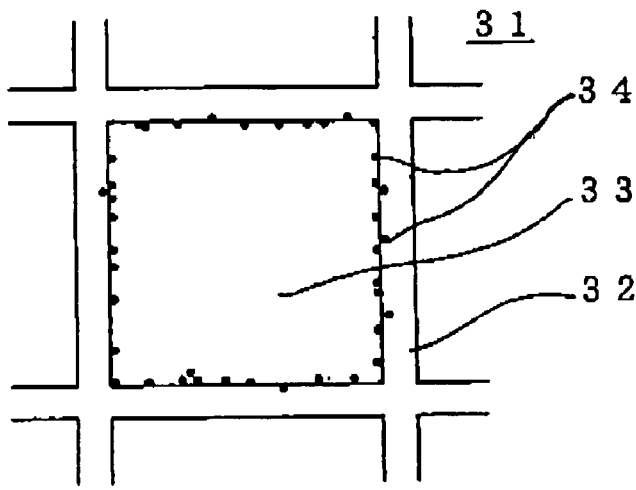
FIG. 6(a), FIG. 6(b) and FIG. 6(c) are enlarged views of cells forming a conventional honeycomb structural body schematically showing a process in which particulates collected by a filter are deposited in partition walls when the conventional honeycomb structural body is used as the filter.
Figure 6B:
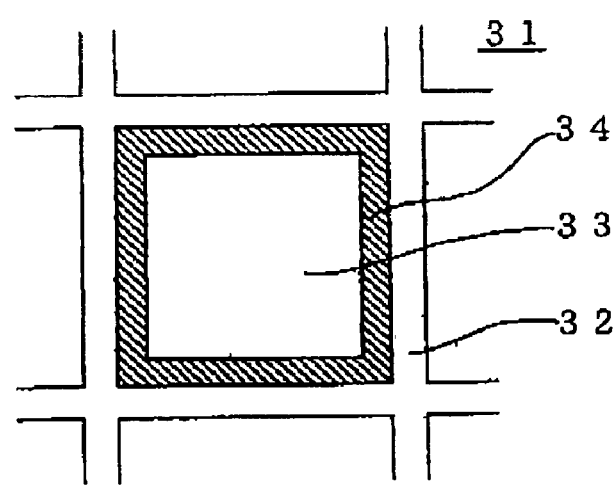
Figure 6C:
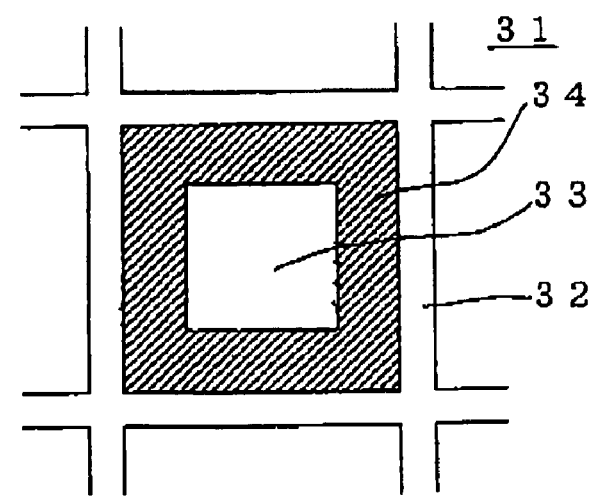

The process of particulate matter deposition can be roughly divided into three stages shown in FIG. 6(*a*) to FIG. 6(*c*). In the first stage (inertial impaction and Brownian motion), as shown in FIG. 6(*a*), particulates 34 are collected by the surface of the partition wall 32 and the pore surface within the partition wall 32. Deposition of the particulates proceeds in the pores opened on the surface of the partition wall 32 and the deposits block the pores. Since the deposits of particulates 34 begin to cover the surface of the partition wall 32, the pressure loss of the honeycomb filter 31 rapidly increases. Since many particulates 34 pass through the pores in the first stage, the collection efficiency is low. If the pore size is large, it takes a long time for the pores to become blocked by deposition of particulates 34 or the pores are not blocked.

After the first stage, as the particulates continue to accumulate, the process proceeds to the second stage (initial direct blockage). As shown in FIG. 6(*b*), the thickness of the deposited layer of particulates 34 gradually increases on the surface of the partition wall 32. In the second stage, the pressure increases in proportion to the thickness of the deposited layer of particulates 34. The collection efficiency is high because the deposited layer of particulates 34 itself forms a cake-like layer that collects particulates 34.

After the second stage, as the particulates further accumulate, the process proceeds to the third stage (post direct blockage). Since the thickness of the deposited layer of particulates 34 rapidly increases as shown in FIG. 6(*c*), the passage for the cell 33 becomes narrow, resulting in an increase in the flow resistance through the passage in the cell 33. For this reason, the pressure loss increases rapidly.

Therefore, when the honeycomb structural body is used as a filter, it is preferable that the second stage last for a long period of time and the honeycomb filter be regenerated during the second stage. In the honeycomb structural body of this embodiment, since the cross-section of the partition wall 2 perpendicular to the flow direction of the fluid has a grille shape of which gratings cross in the x and y axis directions and there are at least two kinds of cells different each other in the cross-sectional areas perpendicular to the flow direction of fluid by virtue of changing the distance between the partition walls in the x axis direction and/or the distance between the partition walls in the y axis direction, it is possible to retard the first stage and the second stage in the deposition process of particulates as compared with a conventional honeycomb structural body having the same surface area of the partition walls and, as a result, it is possible to reduce the rate of increase in the pressure loss.

The honeycomb structural body of this embodiment can be manufactured by the following method, for example.

First, a puddle for forming the honeycomb structural body is prepared. The puddle can be prepared by kneading the raw materials mentioned above as preferable materials for the honeycomb structural body. For example, a mixture of silica, kaolin, talc, and alumina as a cordierite raw material is mixed with a foaming resin as a pore forming material, a binder, a dispersant, and water. The resulting mixture is kneaded to produce a puddle. As the pore forming material, any materials that can be scattered and dissipated during a firing process can be used. Inorganic substances such as carbonaceous materials, polymer compounds such as plastic materials, organic substances such as starch, or the like may be used either independently or in combination of two or more. The puddle thus obtained is extruded into a honeycomb structural body by extrusion using a die provided with a slit of a predetermined shape. The configuration of the die for extrusion forming of a honeycomb structural body will be described in detail later in the discussion of an embodiment of the second invention.

Second, the resulting honeycomb formed article is dried. Although it is possible to employ various drying methods, a combination of microwave drying and hot air drying or a combination of induction drying and hot air drying is preferable. A special method such as freeze-drying can also be suitably used.

Third, both end faces of the dry honeycomb formed article are cut to a prescribed size.

Fourth, specified cells in the dry honeycomb formed article are plugged at the end face. Specifically, in a masking secondary step, a film is attached to the end face of the dry honeycomb formed article. A polyester film is preferably used for this purpose. A film of which the one side is coated with an adhesive can be easily caused to adhere to the end face of the dry honeycomb formed article. Then, the film caused to adhere to the end face of the honeycomb formed article is processed using a laser apparatus that can allow NC scanning to open cells to form an open cell pattern in the shape of houndstooth check on the end face.

Fifth, a filling secondary step is performed. Water, a binder, and glycerol are added to a cordierite raw material to prepare a slurry with a viscosity of about 200 dPa·s. The slurry is filled into a vessel for plugging. The honeycomb formed article, with the film opened in a houndstooth check pattern being attached to the end face is inserted into the vessel to cause the slurry in the vessel to be injected into the cells through the openings, thereby filling the cells with the slurry. The honeycomb formed article is then removed from the vessel. In this manner, the cells on the end face of the honeycomb formed article are plugged in a houndstooth check pattern.

Sixth, to dry the plugged areas, hot air at a temperature of about 140° C. is blown for 5 minutes to the plugged end face of the honeycomb formed article without removing the film. The plugged areas may be also dried on a hot plate. Plugging of the end in a convex form can be confirmed by removing the film after drying. The same procedure is applied to the other end face to form a projected section in the plugging areas on both end faces. A honeycomb structural body of cordierite can be formed by sintering the formed honeycomb article. The method for manufacturing the honeycomb structural body of this embodiment is not limited to the above-described method.

The honeycomb structural body made of two or more integrated segments can be manufactured by fabricating the segments according to the above-mentioned method, bonding the segments using a ceramic cement, for example, and drying and curing the bonded article. A method known in the art may be employed for causing a catalyst to be carried on the honeycomb structural body manufactured in this manner. For example, the honeycomb structural body is wash-coated with a catalyst slurry, dried, and sintered to cause the catalyst to be carried thereon.

Next, one embodiment of the filter structure of the present invention (the second invention) will be described. The filter structure of this embodiment comprises the honeycomb structural body 1 of the first invention as shown in FIG. 1(*a*) and FIG. 1(*b*) installed in a fluid passage to collect substances to be removed from the fluid, particulates, for example.

This configuration not only ensures collection of substances to be removed contained in the fluid in a highly accurate manner, but also can reduce a rise of the pressure loss in the filter structure of this embodiment since cells 3*c* on one end face 13 of the honeycomb structural body 1 have a large cross-sectional area as compared with conventional honeycomb structural bodies as described above.

In this embodiment, it is preferable that the honeycomb structural body 1 be installed so that the cells having the largest cross-sectional area (the largest cells) among the cells 3 forming the honeycomb structural body 1 are open (not plugged) on the end face 13 on the inlet port side of the fluid. The configuration in which the cells having the largest cross-sectional area among the cells 3 are open (not plugged) on the end face 13 on the inlet port side of the fluid effectively controls an increase in the pressure loss due to blockage of the cells on the open end face on the inlet port side with a deposited layer of the substance to be removed.

In this embodiment, it is preferable that the honeycomb structural body 1 be installed so that the total sum of the cross-sectional areas of the cells 3 that are open on the end face on the inlet port side of the fluid is larger than or equal to the total sum of the cross-sectional areas of the cells 3 that are open on the end face on the outlet port side of the fluid. This configuration can effectively control a pressure loss increase due to blockage of the cells 3 on the end face on the inlet port side with a deposited layer of substance to be removed.

In the filter structure of this embodiment, it is preferable that the honeycomb structural body 1 collect and remove fine particulates in exhaust gas as a filter. When exhaust gas discharged from an internal combustion engine or a boiler, particularly exhaust gas discharged from a diesel engine, is filtered as the fluid mentioned above, the effects of the honeycomb filter mentioned above are remarkable as compared with conventional filter structures. The honeycomb filter can also be suitably used as a filter for collecting and removing fine particulate substances contained in raw water, waste water, and the like.

Figure 7:
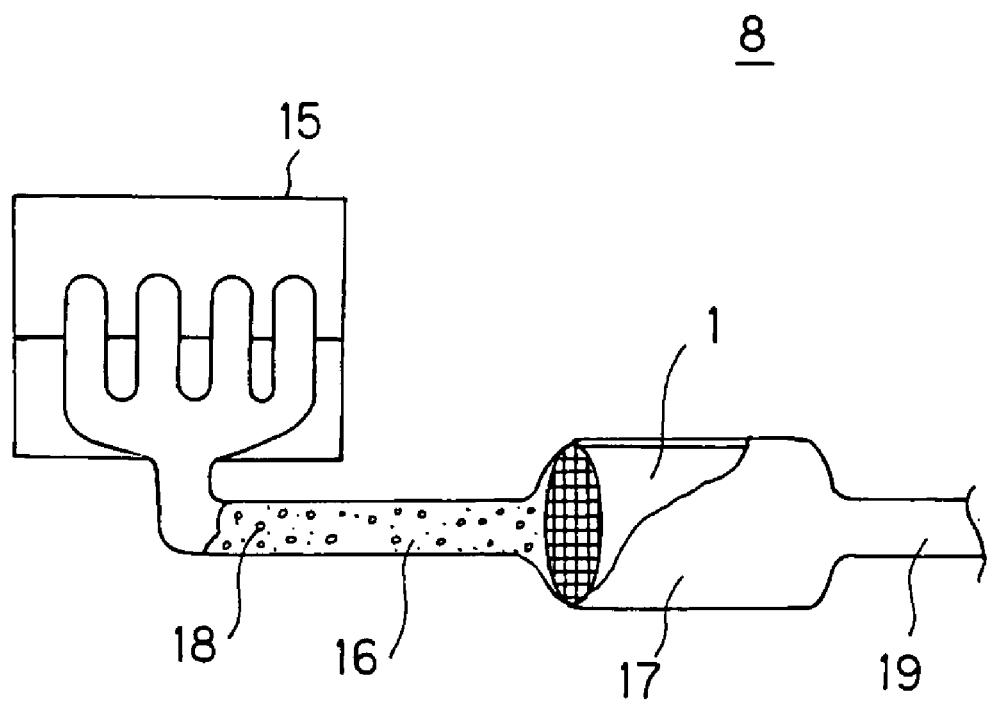
FIG. 7 is a view schematically illustrating one embodiment of the filter structure of the present invention (the second invention).

As a specific example of the filter structure of this embodiment, a filter structure 8 as shown in FIG. 7 can be given, wherein the filter structure 8 comprises the honeycomb structural body 1 used as a filter installed in a casing 17 communicating with a passage 16 for exhaust gas discharged from an engine 15, for example, particulates 18 in the exhaust gas are collected and removed by the honeycomb structural body 1, and purified gas is discharged via a passage 19 on the emission gas discharge side.

Figure 8:
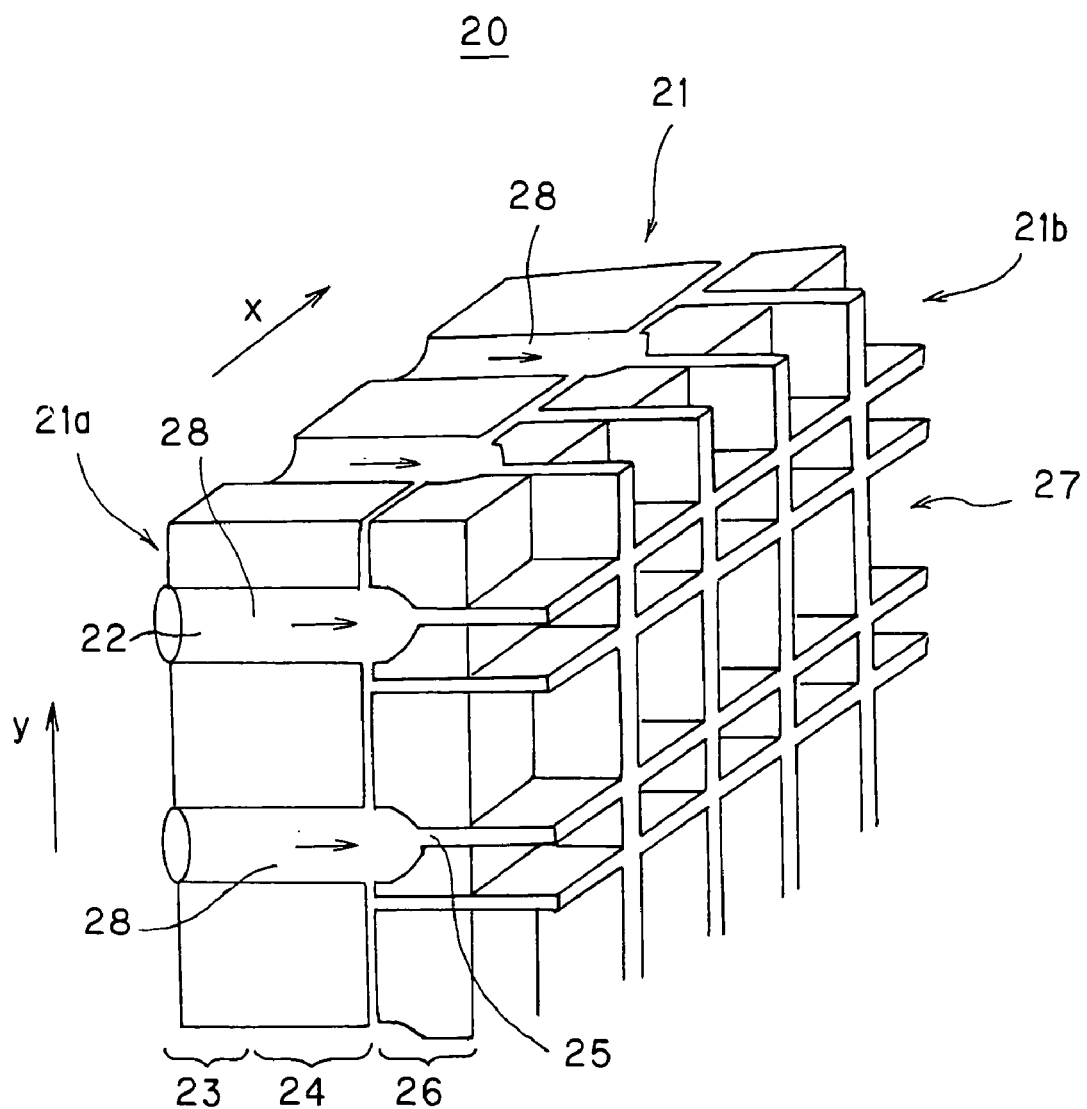
FIG. 8 is a perspective view schematically showing one embodiment of a die for forming the honeycomb structural body by extrusion according to the present invention (the third invention).
Figure 9A:
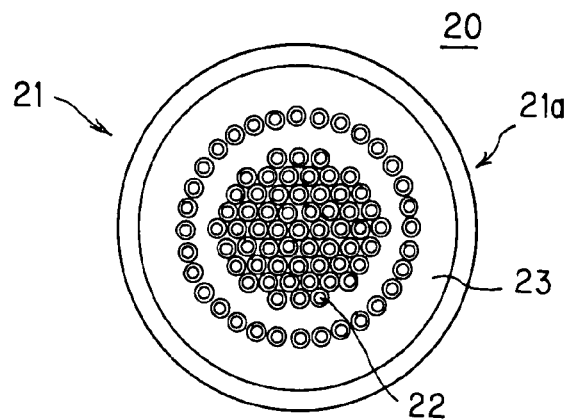
FIG. 9(a) is a plan view showing one end face (the end face on the raw material introducing side) of a die for forming the honeycomb structural body by extrusion according to the present embodiment.
Figure 9B:
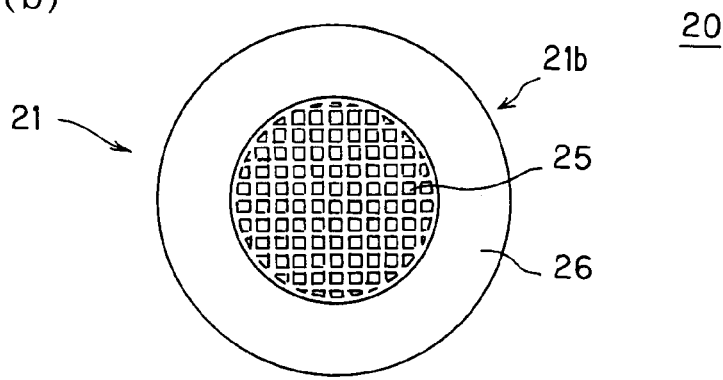
FIG. 9(b) is a plan view showing the other end face (the end face on the raw material extruding side) of the die for forming the honeycomb structural body by extrusion according to this embodiment.
Figure 9C:
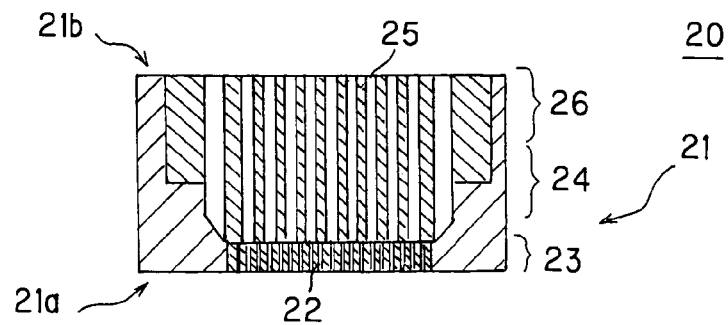
FIG. 9(c) is a cross-sectional view showing the die for forming the honeycomb structural body by extrusion according to this embodiment.
Figure 9D:
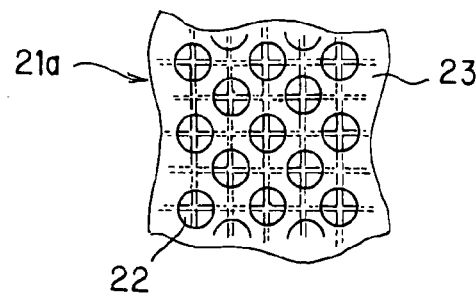
FIG. 9(d) is an enlarged plan view showing the first end face (the end face on the raw material introducing side) of the die for forming the honeycomb structural body by extrusion according to this embodiment.

Next, an embodiment of the die for forming the honeycomb structural body by extrusion of the present invention (the third invention) will be specifically described referring to FIG. 8 and FIGS. 9(*a*) to 9(*d*). FIG. 8 is a perspective view schematically showing a die 20 for forming the honeycomb structural body by extrusion according to this embodiment. FIG. 9(*a*) is a plan view showing one end face (the end face on the raw material introducing side) of the die 20 for forming the honeycomb structural body by extrusion according to this embodiment, FIG. 9(*b*) is a plan view showing the other end face (the end face on the raw material extruding side) of the die 20 for forming the honeycomb structural body by extrusion according to this embodiment, FIG. 9(*c*) is a cross-sectional view showing the die 20 for forming the honeycomb structural body by extrusion according to this embodiment, and FIG. 9(*d*) is an enlarged plan view showing the first end face (the end face on the raw material introducing side) of the die 20 for forming the honeycomb structural body by extrusion according to this embodiment. As shown in FIG. 8 and FIGS. 9(*a*) to 9(*d*), the die 20 for forming the honeycomb structural body by extrusion of this embodiment is composed of a die base 21 having at least two surfaces, which is provided with a raw material introducing part 23 for introducing a raw material 28 from a first opening 22 opening on one side 21*a*, a raw material supply route 24 communicating with the raw material introducing part 23 and functioning as a supply route for the raw material 28 introduced from the raw material introducing part 23, and an extrusion part 26 communicating with the raw material supply route 24 to extrude the raw material 28 supplied by the raw material supply route 24 from a second opening 25 opening on the one side 21*b*, thereby forming a honeycomb structural body. The cross-section of the second openings 25 composing the extrusion part 26 on the plane perpendicular to the direction in which the raw material 28 is extruded has a pattern of a grating 27 as a whole, with crossing slits opening either in the x axis direction and y axis direction, wherein either the intervals between the two adjacent slits opening in the x axis direction or the intervals between the two adjacent slits opening in the y axis direction are not equal (slits are arranged at unequal intervals either in the x axis direction or in the y axis direction).

The die 20 for forming the honeycomb structural body by extrusion configured in this manner can manufacture the honeycomb structural body exhibiting a controlled increase in the pressure loss during use in a simple process at a low production cost. Although this embodiment has the raw material supply route 24 between the raw material introducing part 23 and the extrusion part 26, the raw material supply route 24 is not necessarily essential. The raw material introducing part 23 may directly communicate with the extrusion part 26.

Figure 10:
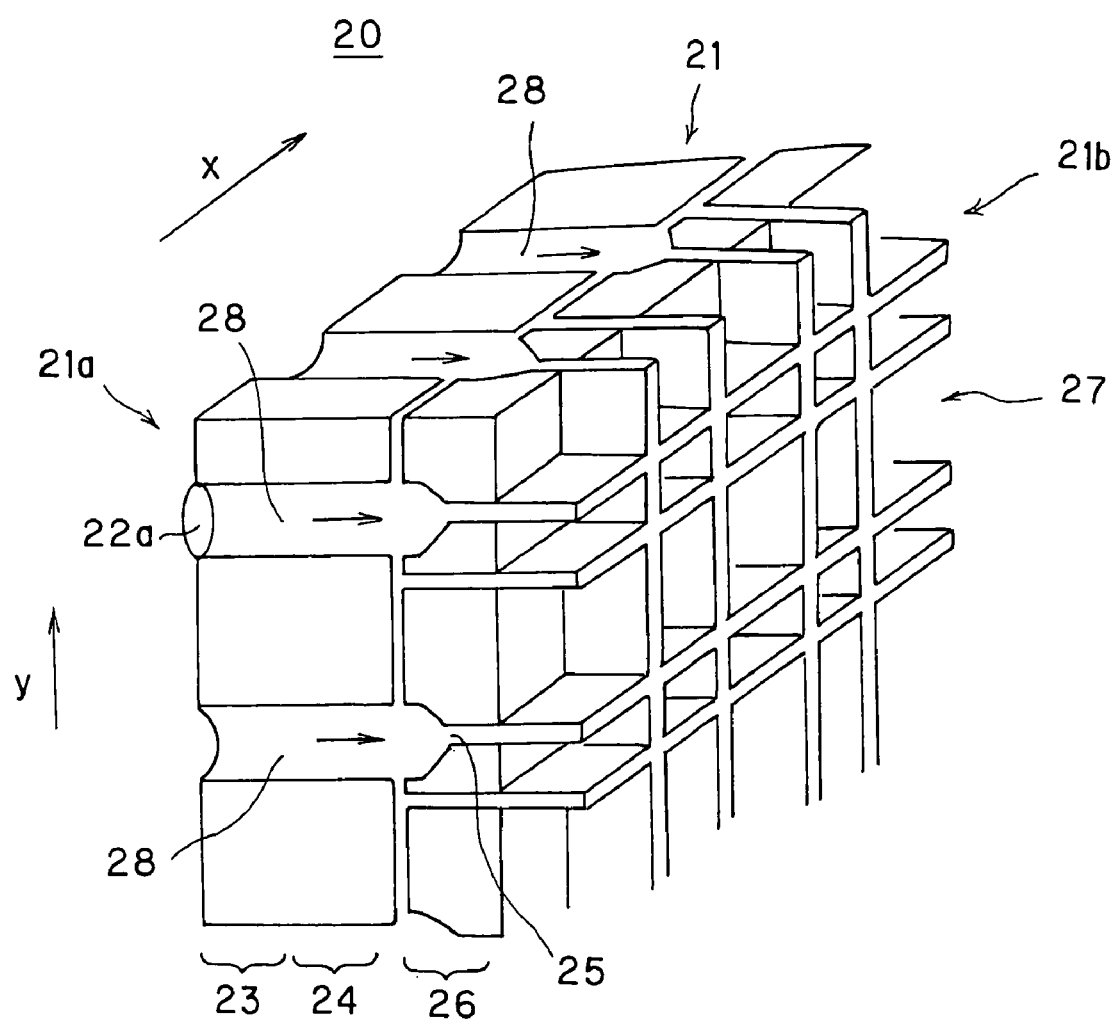
FIG. 10 is a perspective view schematically showing another embodiment of a die for forming the honeycomb structural body by extrusion molding according to the present invention (the second invention).

In the die 20 for forming the honeycomb structural body by extrusion shown in FIG. 8, either the intervals between the two adjacent slits opening in the x axis direction or the intervals between the two adjacent slits opening in the y axis direction are not equal. In FIG. 8, the slits are not arranged at even intervals in the y axis direction, but arranged at even intervals in the x axis direction. In this embodiment, at least one of the intervals between the two adjacent slits opening in the x axis direction or the intervals between the two adjacent slits opening in the y axis direction are not equal. The die 20 for forming the honeycomb structural body by extrusion may have slits arranged with unequal intervals but regularly patterned in the same way both in the x axis direction and in the y axis direction, as shown in FIG. 10. Alternatively, the die 20 may have slits arranged with unequal intervals but regularly patterned in a different way (not shown) in the x axis direction and in the y axis direction. The intervals between the slits can be determined taking the configuration of the resulting honeycomb structural body into consideration.

The distance between the slits may differ at every other interval or two or more intervals, each different from the others, and may be periodically repeated.

Any materials such as steel and alloys can be used as the material of contraction for the die 20 for forming the honeycomb structural body by extrusion shown in FIG. 8 and FIGS. 9(a) to 9(d). Alloy tool steels (SKD11 etc.), for example, are preferable materials.

Such a die for forming the honeycomb structural body by extrusion can be used in the following manner. A clay mixture for forming the honeycomb structural body, for example, is prepared. The raw materials mentioned above as preferable materials for the honeycomb structural body can be used. The raw material is charged into first openings of a raw material introducing section opening to one side of the die for forming the honeycomb structural body by extrusion according to this embodiment. The raw material is fed through raw material supply passages, each communicating with the first openings, to slits of second openings forming an extrusion section, and spreads along the x axis direction and in the y axis direction from the crossing points of the slits. The raw material spread in all sides is molded by extrusion. The raw material extruded from the slits forms the parts corresponding to the partition wall forming the honeycomb structural body. Since either the intervals between the two adjacent slits opening in the x axis direction or the intervals between the two adjacent slits opening in the y axis direction are not equal in the second openings forming the extrusion section for fabricating the die for forming the honeycomb structural body by extrusion according to this embodiment, as described above, the resulting honeycomb structural body is formed from partition walls of which the cross-section perpendicular to the flow direction of the fluid has a grille shape of which gratings cross in the x and y axis directions and, provided that the number of cells (the number of gratins) is specified, there are cells with different cross-sectional areas in the direction perpendicular to the flow of fluid by virtue of changing the intervals of the partition walls in the x axis direction and/or the intervals of the partition walls in the y axis direction.

The slits for the second openings constituting the extrusion section can be formed by electrical discharge machining in electrodes or by a grinding process using a grindstone. NC control of the electrodes or grindstone ensures fabrication of slits with prescribed intervals. To prepare the die 20 for forming the honeycomb structural body by extrusion shown in FIG. 8 by using this means, the electrodes or grindstone may be operated under NC control, while maintaining the intervals between the slits in the x axis direction constant and varying the intervals between the slits in the y axis direction.

EXAMPLES

The present invention will be described in detail by examples, which should not be construed as limiting the present invention.

Example

A mixture of silica, kaolin, talc, and alumina as a cordierite raw material was mixed with a foaming resin as a pore forming material, a binder, a dispersant, and water. The resulting mixture was kneaded to produce a clay mixture. The clay mixture thus obtained was fabricated into a honeycomb structural body by extrusion molding using a die of a predetermined shape. A die with the same configuration as the die 20 for forming the honeycomb structural body by extrusion shown in FIG. 8 was used.

Next, the honeycomb formed article obtained was dried by a drying process combining microwave drying or induction drying with hot air drying. The resulting dry honeycomb formed article was cut into a prescribed shape.

Then, a film caused to adhere to the end face of the honeycomb formed article cut into a prescribed shape was processed using a laser apparatus that can allow NC scanning to open cells to form an open cell pattern in the shape of a houndstooth check on the end face.

Water, a binder, and glycerol were added to a cordierite raw material to prepare a slurry with a viscosity of about 200 dPa·s. The slurry was charged into a vessel for plugging. The honeycomb formed article with the film opened in a houndstooth check pattern attached was inserted into the vessel. In this manner, the cells were plugged in a houndstooth check pattern.

The plugged parts of each end face of the honeycomb formed article thus obtained were dried by blowing hot air at about 140° C. for about 5 minutes and the dry honeycomb formed article was sintered to obtain a honeycomb structural body.

In the honeycomb structural body of this example, the cross-section of the partition wall perpendicular to the flow direction of the fluid had a grille shape of which gratings cross in the x and y axis directions and there was the intervals of the partition walls was changed in they axis direction, while the number of the cells (gratings) was maintained at a prescribed number. Specifically, the diameter of the end face was about 229 mm, the length in the flow direction was about 150 mm, the cell form was square, and the thickness of the partition wall was about 0.3 mm. The cell pitch in the x axis direction was about 1.6 mm and the cell pitch in the y axis direction was designed to have a wide interval and a narrow interval at a ratio of 2:1. The plugging thickness from the end face to the back of the passage was about 3 mm. The porosity of the partition walls of the resulting honeycomb structural body measured using a mercury porosimeter was 67% and the average pore size was 27 µm.

Comparative Example

A honeycomb structural body was formed in the same manner as in Example 1 except that a die having slits with the same and fixed intervals in the x and y axis directions was used as the die for forming the honeycomb structural body by extrusion. The resulting honeycomb structural body has a cell pitch of about 1.6 mm in the x and y axis directions.

Figure 11:
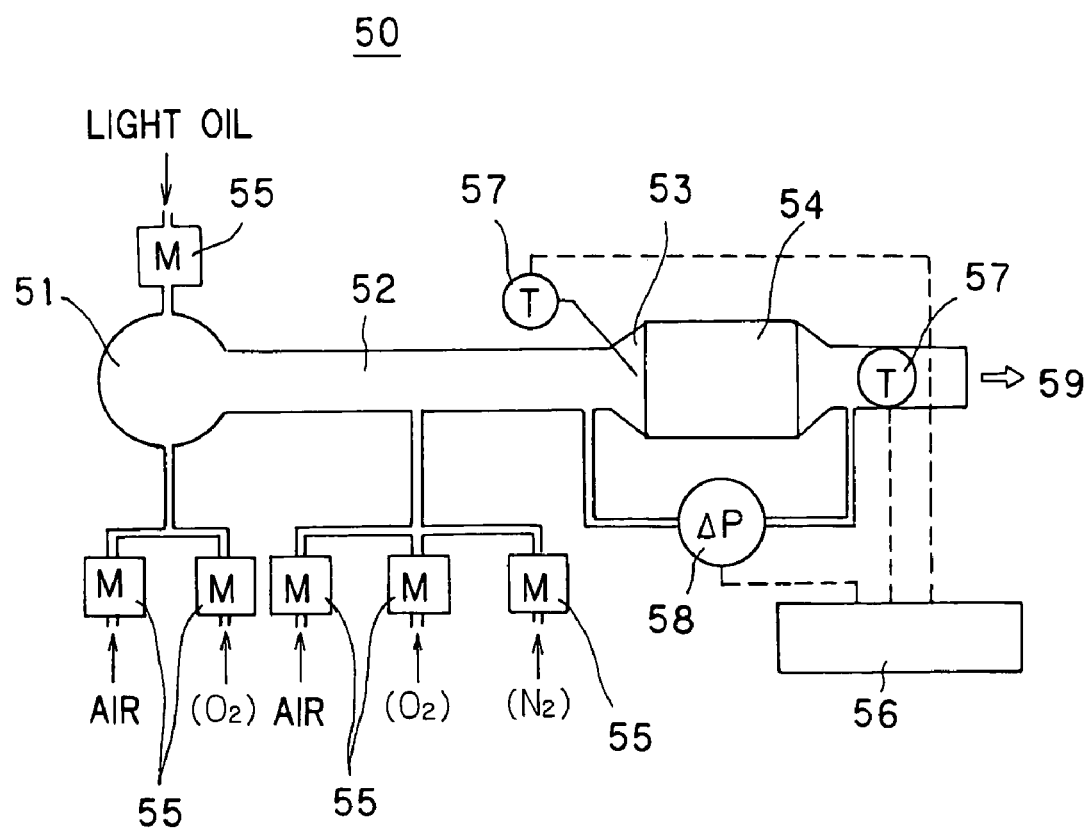
FIG. 11 is a block diagram for illustrating a soot generator used in the example of the present invention.

A test for particulate matter deposition was carried out on the resulting honeycomb structural bodies in the Example and Comparative Example using a soot generator to determine the pressure loss of the honeycomb structural bodies due to deposited particulates. As shown in FIG. 11, the soot generator comprised a combustion chamber 51 to generate a large amount of particulates by burning diesel fuel, a passage route 52 through which the combustion gas and particulates generated in the combustion chamber 51 flow, and a test chamber 53 with a honeycomb structural body 54 installed therein to cause a large amount of particulates to be deposited in the honeycomb structural body 54 in a short period of time. A flow meter 55 is installed to supply fuel and air or oxygen, as required, to the combustion chamber 51. Another flow meter 55 is installed in a passage route 52 to supply air or, as required, oxygen and nitrogen. The test chamber 53 is equipped with a thermocouple 57 connected to a recorder 56 to measure temperatures and a manometer 58 for measuring the internal pressure of the test chamber 53. The test chamber 53 is connected to an exhaust gas conduit 59 to discharge gas flowing from the passage route 52 and passes through the honeycomb structural body 54. The temperature in the test chamber 53 while particulates are collected was about 200° C. and the flow rate was 9 Nm³/min. The amount of particulates in this instance was 90 g per hour. The deposition of particulates on the end face of the honeycomb structural bodies 54 of the Example and Comparative Example was confirmed.

Figure 12A:
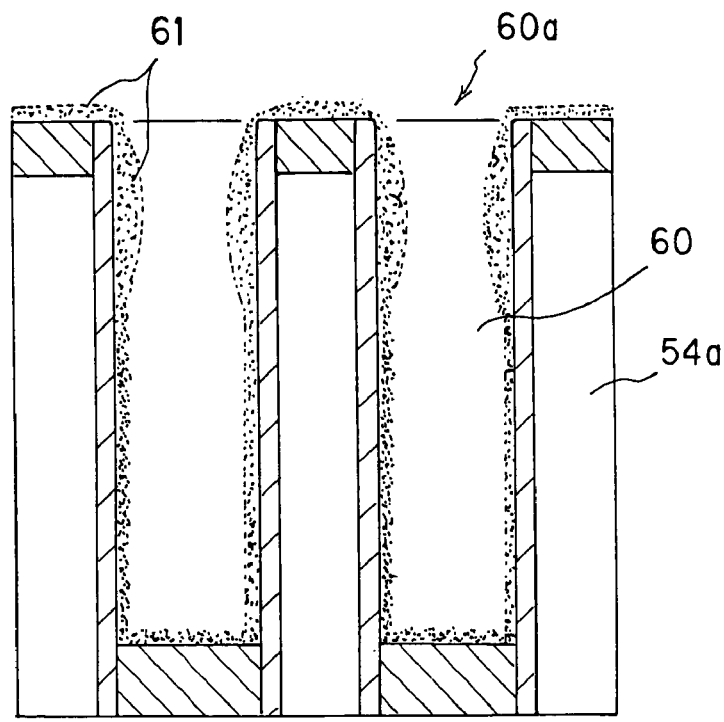
FIG. 12(a) and FIG. 12(b) are cross-sectional views showing a process of particulate matter deposition on the honeycomb structural body in the example of the present invention.
Figure 12B:
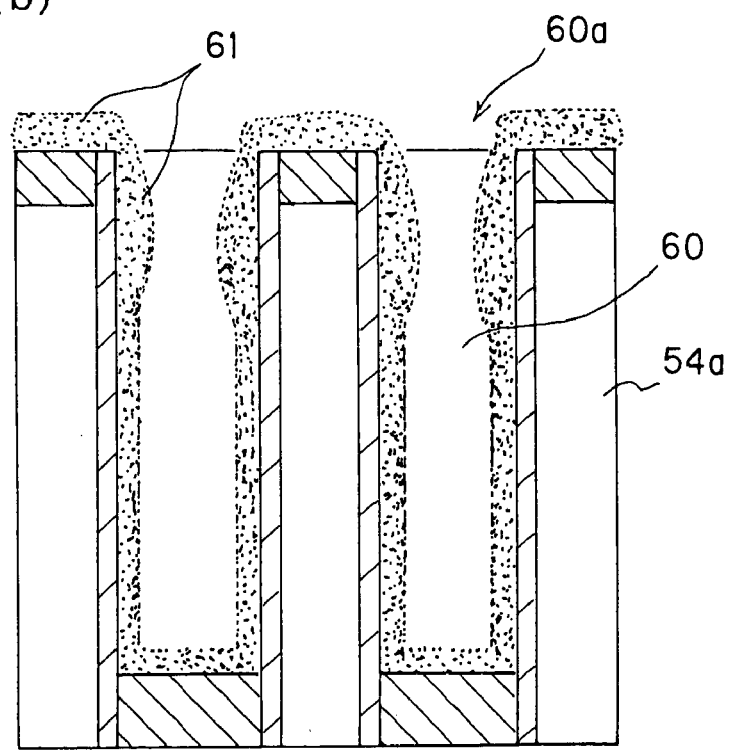

In the honeycomb structural body 54a of this Example, particulates 61 were deposited and accumulated around the entrance 60a of the cell 60 and narrowed the entrance 60a as shown in FIG. 12(a). Since the honeycomb structural body 54a of this Example has a comparatively wide opening for the entrance 60a of the cell 60, particulates 61 invaded the cell 60. Even if particulates 60 were to be further deposited, the entrance 60a of the cell 60 having a large opening area was not blocked as shown in FIG. 12(b). Moreover, since the surface area of the partition walls is large, the thickness of the deposition particulates 61 was slight. For these reasons, a rapid increase in the pressure loss did not take place in the honeycomb structural body 54a of this Example.

Figure 13A:
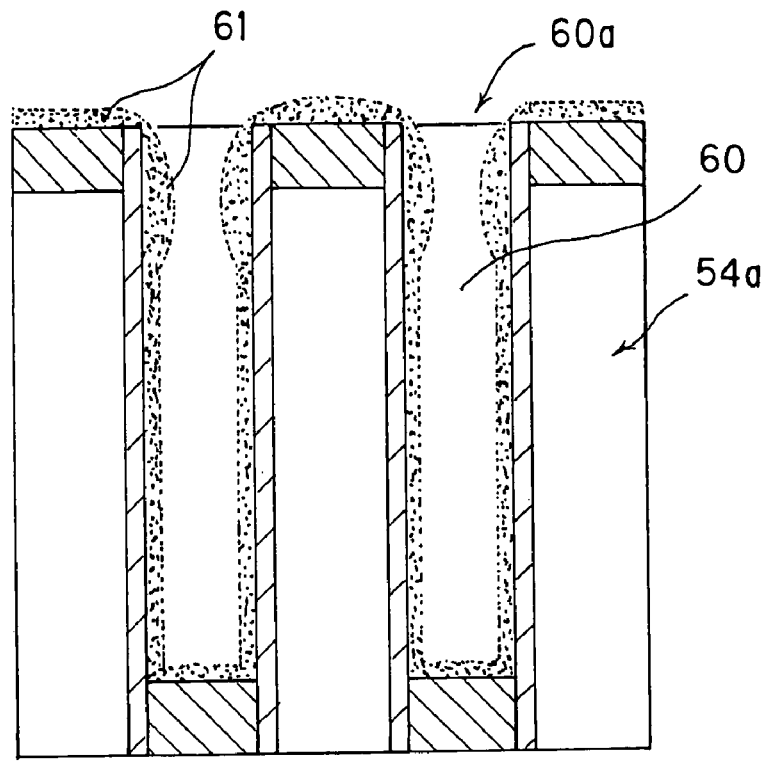
FIG. 13(a) and FIG. 13(b) are cross-sectional views showing a process of particulate matter deposition on the honeycomb structural body in the comparative example.
Figure 13B:
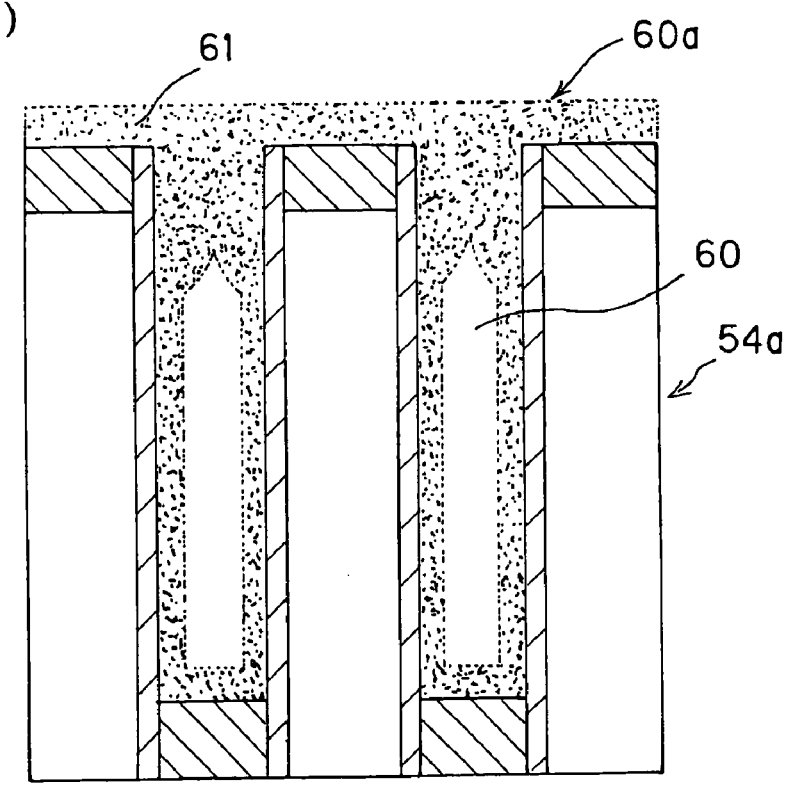
Figure 14A:
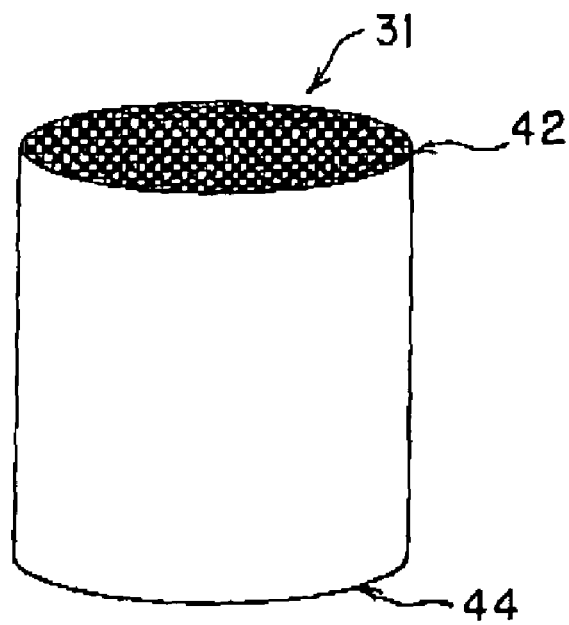
FIG. 14(a) is a perspective view of a conventional honeycomb structural body and FIG. 14(b) is an enlarged plan view of cells forming the honeycomb structural body.
Figure 14B:
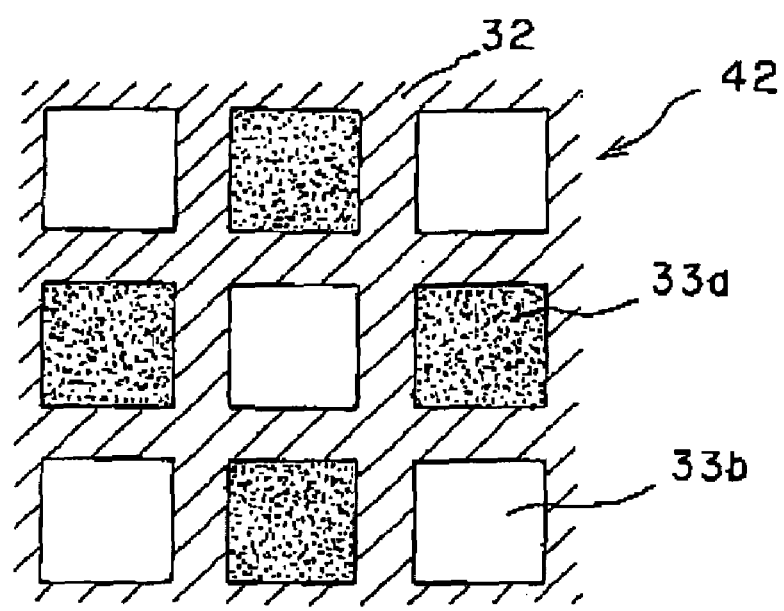

In the honeycomb structural body 54b of the Comparative Example, particulates 61 were deposited and accumulated around the entrance 60a of the cell 60 and narrowed the entrance 60a as shown in FIG. 13(a). When particulates 60 were further deposited, the entrance 60a of the cell 60 was blocked as shown in FIG. 13(b), resulting in a rapid increase in the pressure loss.

As described above, the present invention provides a honeycomb structural body suitably used as a filter for collecting fine particles in exhaust gas from internal combustion engines and boilers or as a filter for liquids in water supply and sewerage systems, while controlling an increase in the pressure loss during use, a system for removing fine particulates using such a honeycomb structural body, and a die for forming the honeycomb structural body by extrusion.

What is claimed is:

1. A honeycomb structural body having a plurality of cells to function as a passage for a fluid divided by porous partition walls, specified cells being plugged at one of two end faces and the remaining cells being plugged at other end face alternately, a fluid flowing into an unplugged end face side of one set of cells being caused to pass through the cells and permeate through the partition walls, thus permeated fluid being discharged from an unplugged end face side of the other cells, wherein a cross-section pattern of the partition walls perpendicular to flow direction of the fluid has a grille shape of which gratings cross in x axis and y axis directions, and there are at least two kinds of cells different from each other in their cross-sectional areas perpendicular to the flow direction of a fluid to be filtered due to different interval pitches of the partition walls in the x axis direction and/or different interval pitches of the partition walls in the y axis direction, wherein, in the cross-section pattern, each partition wall constitutes a straight line extending across an entire area of the cross-section pattern.

2. The honeycomb structural body according to claim 1, wherein the intervals of the partition walls in the x axis direction and/or the intervals of the partition walls in the y axis direction are determined by a repetition of which a unit comprising a plurality of partition walls is a prescribed pattern, whereby intervals of the partition walls are changed, as predetermined.

3. The honeycomb structural body according to claim 2, wherein the partition wall is made of a material containing a ceramic and/or a metal as major components.

4. The honeycomb structural body according to claim 2, wherein the partition wall has a porosity of 20% or more.

5. The honeycomb structural body according to claim 4, wherein the partition wall is made of a material containing a ceramic andior a metal as major components.

6. The honeycomb structural body according to claim 1, wherein one of the two end faces of the specified cells and the other end face of the remaining cells are alternately plugged to form a checkerwise pattern as a whole.

7. The honeycomb structural body according to claim 1, wherein the partition wall has a porosity of 20% or more.

8. The honeycomb structural body according to claim 7, wherein the partition wall is made of a material containing a ceramic and/or a metal as major components.

9. The honeycomb structural body according to claim 1, wherein the partition wall is made of a material containing a ceramic and/or a metal as major components.

10. The honeycomb structural body according to claim 9, wherein the major components forming the partition wall are at least one material selected from the group consisting of cordierite, mullite, alumina, spinel, silicon carbide, silicon nitride, aluminum nitride, zirconia, lithium aluminum silicate, aluminum titanate, Fe—Cr—Al metals, metal silicon, activated carbon, silica gel, and zeolite.

11. The honeycomb structural body according to claim 1, wherein a catalyst is carried on surface of the partition wall and/or pore surface inside the partition wall.

12. The honeycomb structural body according to claim 1, wherein the partition walls have a same thickness in at least one of the x axis or y axis directions.

13. A honeycomb structural body having a plurality of cells to function as a passage for a fluid divided by porous partition walls, specified cells being plugged at one of two end faces and the remaining cells being plugged at other end face alternately, a fluid flowing into an unplugged end face side of one set of cells being caused to pass through the cells and permeate through the partition walls, thus permeated fluid being discharged from an unplugged end face side of the other cells, wherein a cross-section pattern of the partition walls perpendicular to flow direction of the fluid has a grille shape of which gratings cross in x axis and y axis directions, and there are at least two kinds of cells different from each other in their cross-sectional areas perpendicular to the flow direction of a fluid to be filtered due to different interval pitches of the partition walls in the x axis direction and/or different interval pitches of the partition walls in the y axis direction, wherein a plurality of cells having largest cross-section among said plurality of cells has a rectangle shape and thickness of partition wall defining a long side of the cell having the largest cross-section is thicker than thickness of partition wall defining a short side of the cells having largest cross-section.

14. A filter structure comprising a honeycomb structural body having a plurality of cells to function as a passage for a fluid divided by porous partition walls, specified cells being plugged at one of two end faces and the remaining cells being plugged at other end face alternately, a fluid flowing into an unplugged end face side of one set of cells being caused to pass through the cells and permeate through the partition walls, thus permeated fluid being discharged from an unplugged end face side of the other cells, wherein a cross-section pattern of the partition walls perpendicular to flow direction of the fluid has a grille shape of which gratings cross in x axis and y axis directions, and there are at least two kinds of cells different from each other in their cross-sectional areas perpendicular to the flow direction of a fluid to be filtered due to different interval pitches of the partition walls in the x axis direction and/or different interval pitches of the partition walls in the y axis direction; said honeycomb structural body being installed in a fluid passage to collect substances to be removed from the fluid, wherein, in the cross-section pattern, each partition wall constitutes a straight line extending across an entire area of the cross-section pattern.

15. The filter structure according to claim 14, wherein the honeycomb structural body is installed in such manner that a total sum of a cross-sectional area perpendicular to the fluid flow direction at end face of cells that are open on an end face on an inlet port side of the fluid is larger than or equal to a total sum of a cross-sectional area perpendicular to the fluid flow direction at an end face of cells that are open on an end face on an outlet port side of the fluid.

16. The filter structure according to claim 14, wherein the honeycomb structural body is used to collect and remove fine particulates in exhaust gas as a filter.

17. The filter structure according to claim 14, wherein the partition walls have a same thickness in at least one of the x axis or y axis directions.

18. A filter structure comprising a honeycomb structural body having a plurality of cells to function as a passage for a fluid divided by porous partition walls, specified cells being plugged at one of two end faces and the remaining cells being plugged at other end face alternately, a fluid flowing into an unplugged end face side of one set of cells being caused to pass through the cells and permeate through the partition walls, thus permeated fluid being discharged from an unplugged end face side of the other cells, wherein a cross-section pattern of the partition walls perpendicular to flow direction of the fluid has a arille shape of which gratings cross in x axis and y axis directions, and there are at least two kinds of cells different from each other in their cross-sectional areas perpendicular to the flow direction of a fluid to be filtered due to different interval pitches of the partition walls in the x axis direction and/or different interval pitches of the partition walls in the y axis direction; said honeycomb structural body being installed in a fluid passage to collect substances to be removed from the fluid, wherein, in the cross-section pattern, each partition wall constitutes a straight line extending across an entire area of the cross-section pattern;

wherein the cells having largest cross-sectional area perpendicular to fluid flow direction among the cells forming the honeycomb structural body are open without being plugged at an end face on an inlet port side of the fluid and are plugged only at an end face opposite the inlet port side.

* * * * *